(12) United States Patent
Yamazaki et al.

(10) Patent No.: US 9,212,928 B2
(45) Date of Patent: Dec. 15, 2015

(54) NAVIGATION APPARATUS HAVING SCREEN CHANGING FUNCTION

(75) Inventors: Satoshi Yamazaki, Kanagawa (JP); Kaori Amano, Kanagawa (JP)

(73) Assignee: Sony Corporation, Tokyo (JP)

( * ) Notice: Subject to any disclaimer, the term of this patent is extended or adjusted under 35 U.S.C. 154(b) by 738 days.

(21) Appl. No.: 12/693,924

(22) Filed: Jan. 26, 2010

(65) Prior Publication Data

US 2010/0192085 A1    Jul. 29, 2010

(30) Foreign Application Priority Data

Jan. 27, 2009    (JP) ................................ P2009-015735

(51) Int. Cl.
*G01C 21/36* (2006.01)
*G06F 3/0481* (2013.01)
*G06F 3/0488* (2013.01)

(52) U.S. Cl.
CPC .......... *G01C 21/3664* (2013.01); *G06F 3/0481* (2013.01); *G06F 3/0488* (2013.01)

(58) Field of Classification Search
CPC .. G06F 3/0481; G06F 3/0488; G01C 21/3664
USPC .................... 715/773, 778, 783, 802
See application file for complete search history.

(56) References Cited

U.S. PATENT DOCUMENTS

2002/0051014 A1    5/2002 Nagasaka et al.
2003/0117440 A1*   6/2003 Hellyar et al. ................ 345/767
2003/0179240 A1*   9/2003 Gest ............................... 345/779
2005/0096812 A1*   5/2005 Nezu et al. ...................... 701/36
2005/0110914 A1    5/2005 Lee (Continued)

FOREIGN PATENT DOCUMENTS

EP    1 519 155    3/2005
EP    1 835 383    9/2007

(Continued)

OTHER PUBLICATIONS

Alt-Tab, archived by the Internet Wayback Machine on Dec. 9, 2007 and retrieved from https://web.archive.org/web/20071209082638/http://en.wikipedia.org/wiki/Alt-Tab 1/ on Jan. 27, 2015.*

(Continued)

*Primary Examiner* — Aaron Lowenberger
(74) *Attorney, Agent, or Firm* — Paratus Law Group, PLLC

(57) ABSTRACT

There is provided a navigation apparatus including: a display unit having a display screen; a touch panel provided to the display screen; and a display controller that selectively changes first, second, and third screens in response to contacting the touch panel to be displayed, wherein each of the screens has a manipulation-button display area for displaying a screen-changing button, and wherein, the display controller performs a first displaying operation of circulatingly changing the screens in a predetermined order to be displayed at each time of contacting the manipulation-button display area, a second displaying operation of displaying a pop-up menu including first, second, and third screen-selecting buttons for directly selecting the screens at the same time of the first displaying operation, and a third displaying operation of displaying on the display screen one screen selected among the screens in response to contacting the screen-selecting buttons displayed by the second displaying operation.

10 Claims, 9 Drawing Sheets

(56) References Cited

U.S. PATENT DOCUMENTS

| | | | | |
|---|---|---|---|---|
| 2005/0267676 A1* | 12/2005 | Nezu et al. | ................... | 701/200 |
| 2005/0273466 A1* | 12/2005 | Yoon | .............................. | 707/100 |
| 2006/0161847 A1* | 7/2006 | Holecek et al. | ............... | 715/716 |
| 2008/0109753 A1* | 5/2008 | Karstens | ....................... | 715/802 |
| 2009/0135147 A1* | 5/2009 | Hsu et al. | ...................... | 345/173 |
| 2010/0281052 A1* | 11/2010 | Geelen | .......................... | 707/770 |

FOREIGN PATENT DOCUMENTS

| | | |
|---|---|---|
| JP | 2005-96596 | 4/2005 |
| JP | 2006-96252 | 4/2006 |
| JP | 2008-90376 | 4/2008 |
| WO | WO 2009/084185 | 7/2009 |

OTHER PUBLICATIONS

SET Consulting—Forgotten Basics in XP/Vista and XP Power Toys, archived by the Internet Wayback Machine on Aug. 5, 2008 and retreieved from https://web.archive.org/web/20080805190546/http://www.setconsulting.com/newsletters/set2007_05.php on Jan. 27, 2015.*

European Search Report from EP Application No. 10 15 1402 dated Jun. 29, 2010.

Article 94(3) EPC from EP Application No. 10 151 402.4 dated Sep. 7, 2012.

* cited by examiner

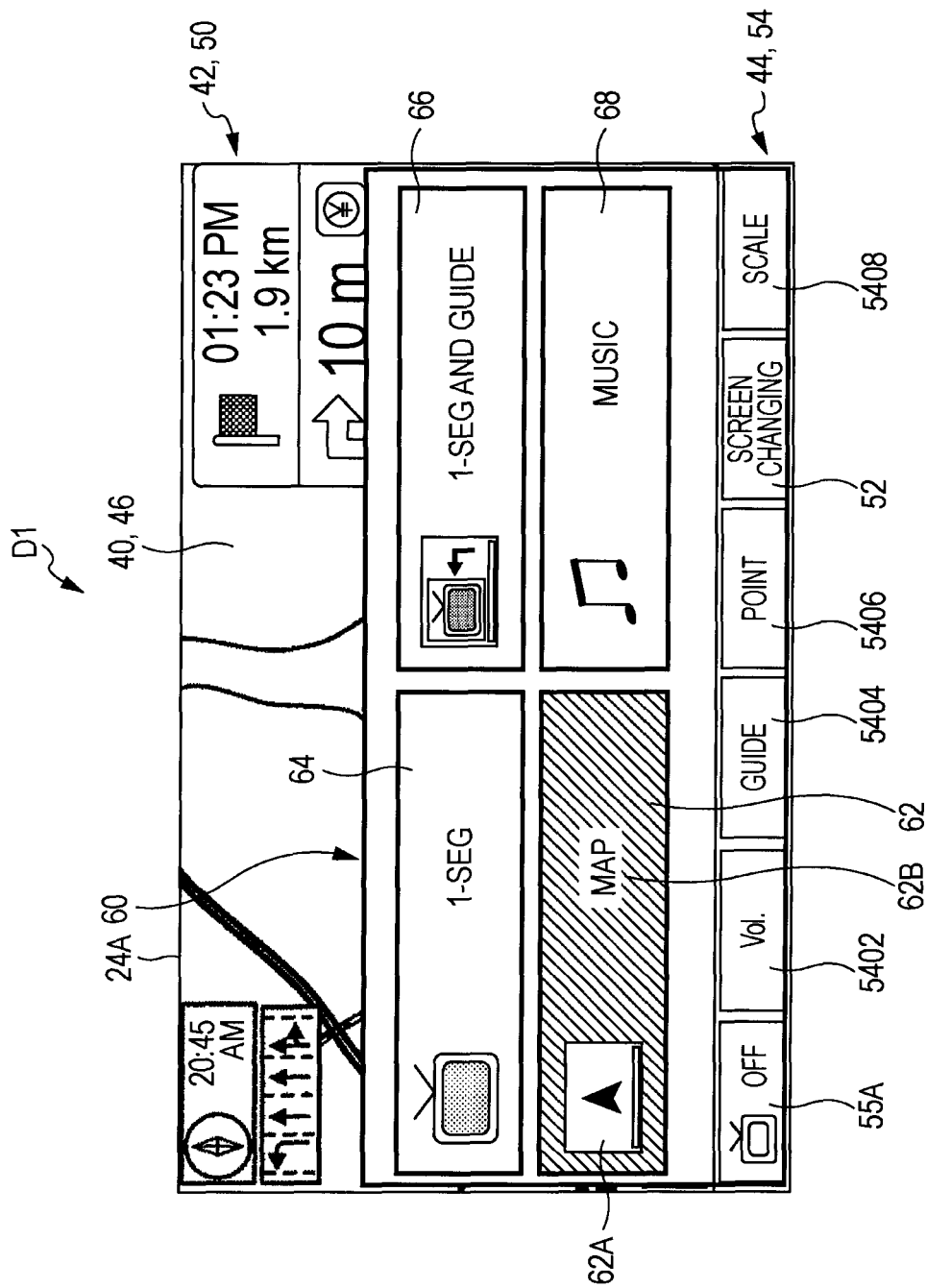

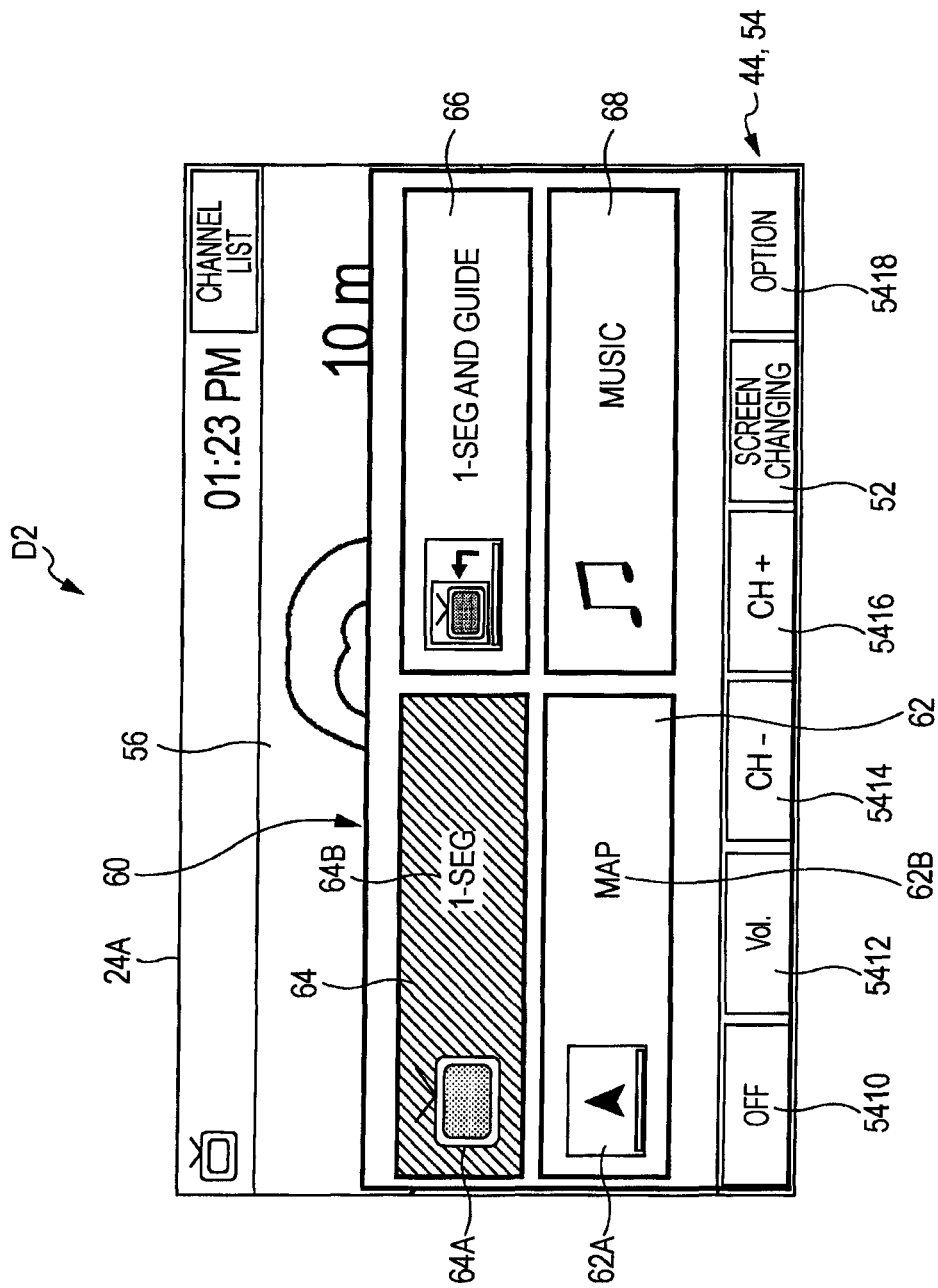

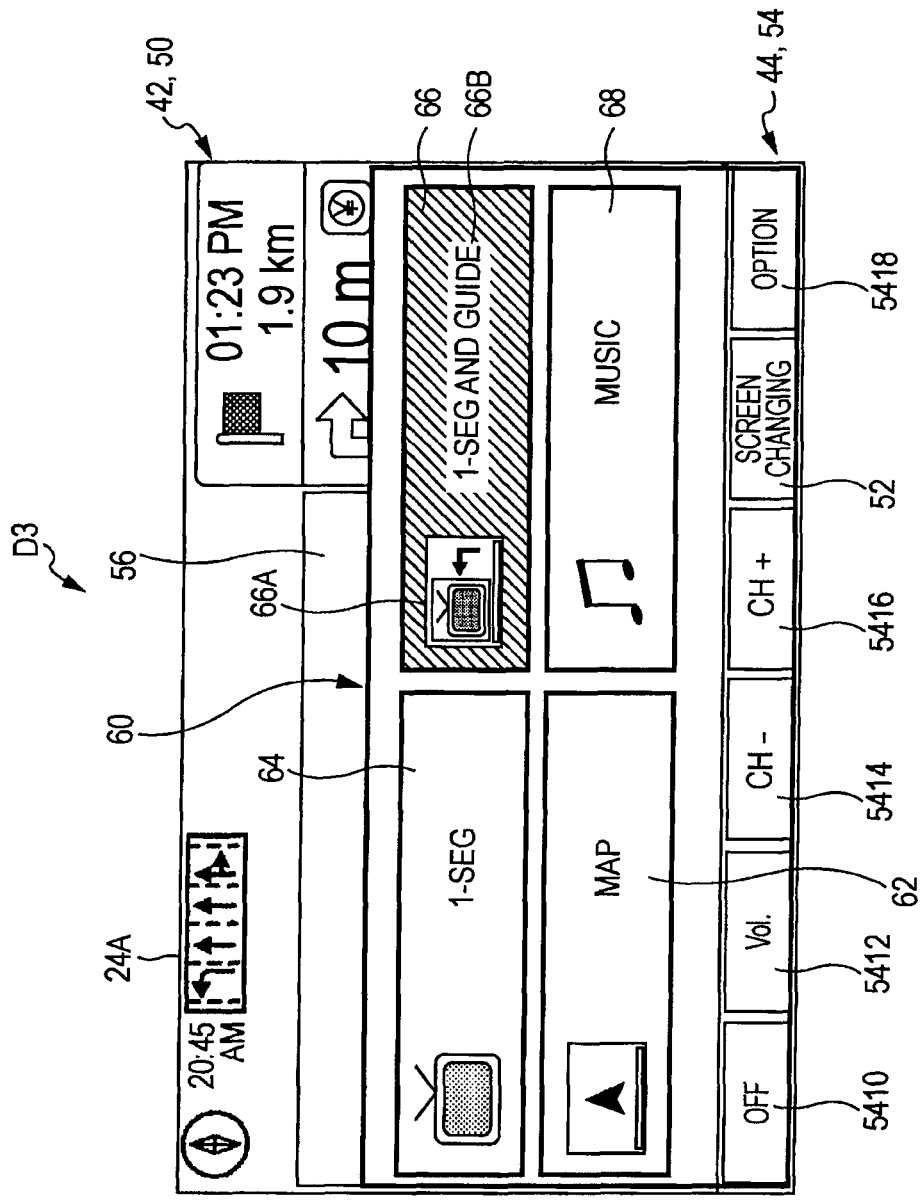

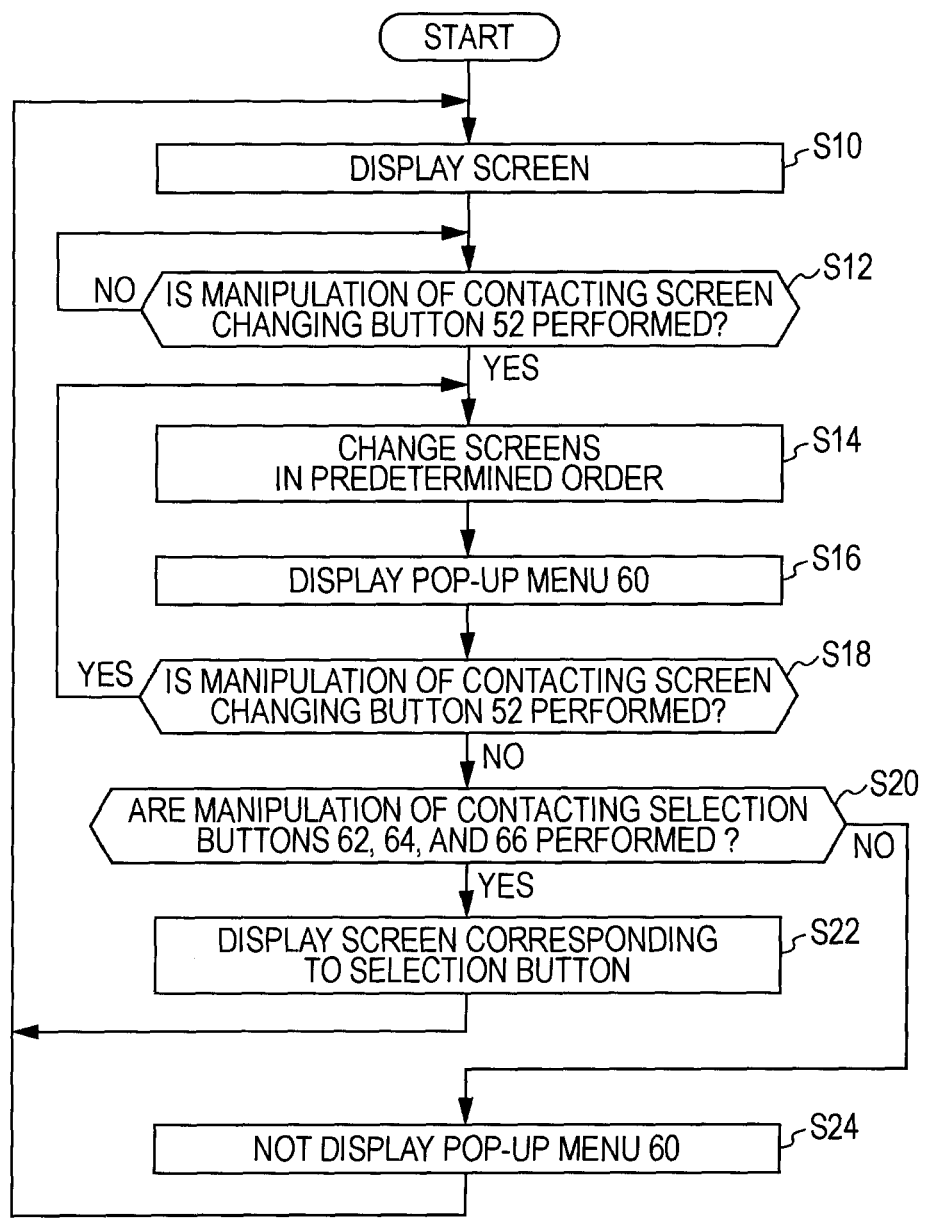

US 9,212,928 B2

NAVIGATION APPARATUS HAVING SCREEN CHANGING FUNCTION

BACKGROUND OF THE INVENTION

1. Field of the Invention

The present invention relates to a navigation apparatus.

2. Description of the Related Art

There has been a navigation apparatus including a display unit having a display screen and a touch panel covering the display screen, in which a plurality of screens are selectively changed to be displayed on the display screen in response to manipulation of contacting the touch panel (refer to Japanese Unexamined Patent Application Publication Nos. 2005-96596 and 2008-90376).

However, in order to selectively change a plurality of the screens, manipulation of contacting manipulation button is repetitively performed.

Therefore, there is a problem in that the manipulation of contacting the manipulation button is repetitively performed until a desired screen is displayed. In addition, if the repetitive manipulation of contacting is rapidly performed, the manipulation of contacting may be erroneously performed, so that a screen other than the desired screen may be displayed. Therefore, improvement of the usability of the navigation apparatus has been tried.

SUMMARY OF THE INVENTION

It is desirable to provide a navigation apparatus having an advantage of displaying a desired screen by simple manipulation and improving manipulation capability.

According to a first embodiment of the present invention, there is provided a navigation apparatus including: a display unit having a display screen; a touch panel provided to the display screen; and a display controller that selectively changes a first screen, a second screen, and a third screen in response to manipulation of contacting the touch panel to be displayed on the display screen, in which each of the first screen, the second screen, and the third screen has a manipulation button display area for displaying a screen changing button, and in which the display controller performs a first displaying operation of circulatingly changing the first screen, the second screen, and the third screen in a predetermined order to be displayed at each time of manipulation of contacting the manipulation button display area, a second displaying operation of displaying on the display screen a pop-up menu including a first screen selecting button, a second screen selecting button, and a third screen selecting button for directly selecting the first screen, the second screen, and the third screen at the same time of the first displaying operation, and a third displaying operation of displaying on the display screen one screen selected among the first screen, the second screen, and the third screen in response to manipulation of contacting the first screen selecting button, the second screen selecting button, and the third screen selecting button displayed on the display screen by the second displaying operation.

According to the invention, a desired screen may be displayed by performing manipulation of contacting one screen selecting button selected among the first screen selecting button, the second screen selecting button, and the third screen selecting button of the pop-up menu displayed by performing manipulation of contacting the screen changing button.

BRIEF DESCRIPTION OF THE DRAWINGS

FIG. 6 is a diagram illustrating a state in which a pop-up menu is displayed to overlap the first display screen.

FIG. 7 is a diagram illustrating a state in which the pop-up menu is displayed to overlap the second display screen.

FIG. 8 is a diagram illustrating a state in which the pop-up menu is displayed to overlap the third display screen.

FIG. 9 is a flowchart illustrating a screen changing operation.

DESCRIPTION OF THE PREFERRED EMBODIMENTS

Now, embodiments of the invention are described with reference to FIGS. 1 to 9. In the embodiments, a case where a navigation apparatus 10 is a portable navigation apparatus (PND, personal navigation device) is described.

Figure 1:
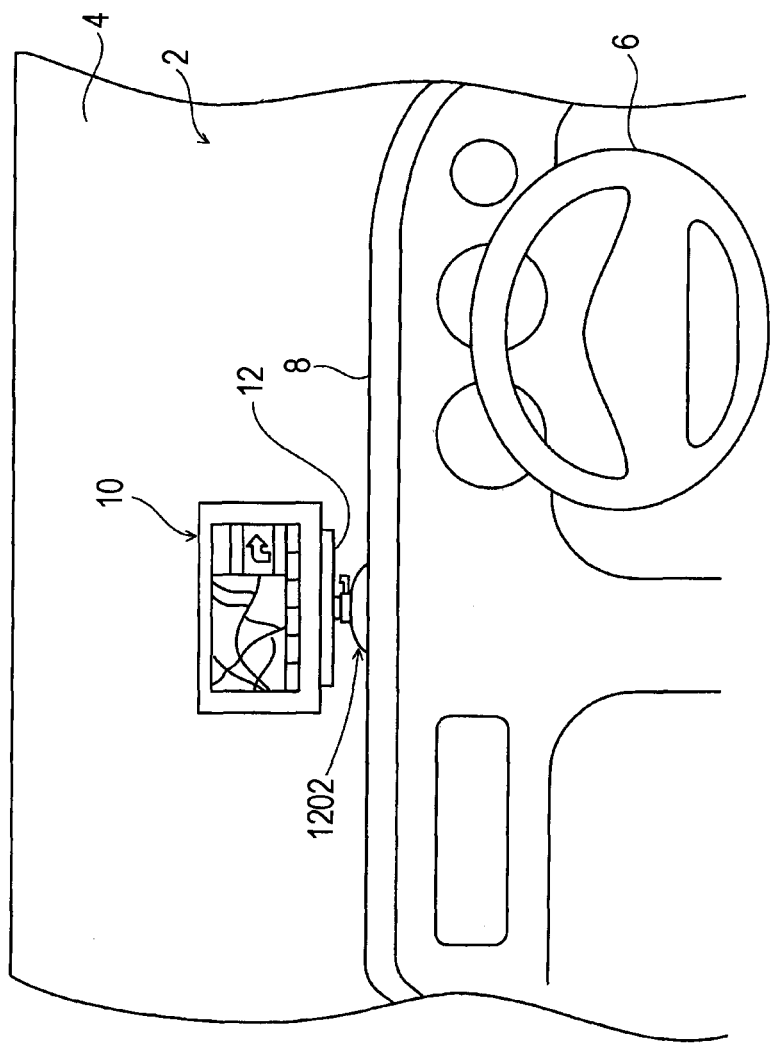
FIG. 1 is a diagram illustrating a state in which a navigation apparatus according to an embodiment is installed in an interior of a car.

In FIG. 1, reference numerals 2, 4, 6, and 8 denote a car interior, a windshield, a steering wheel, and a dashboard, respectively.

As shown in FIG. 1, the navigation apparatus 10 is detachably mounted on an in-car cradle 12, and the navigation apparatus 10 is fixed to the car interior 2 through the in-car cradle 12.

A cupule device 1202 is disposed at the bottom of the in-car cradle 12. By suction-attaching the cupule device 1202 on the dashboard 8, the in-car cradle 12 is detachably fixed to the car interior 2.

By mounting the navigation apparatus 10 on the in-car cradle 12, the navigation apparatus 10 together with the in-car cradle 12 functions as an in-car navigation apparatus.

In addition, by carrying the navigation apparatus 10 detached from the in-car cradle 12, the navigation apparatus 10 functions as a portable navigation apparatus.

Figure 2:
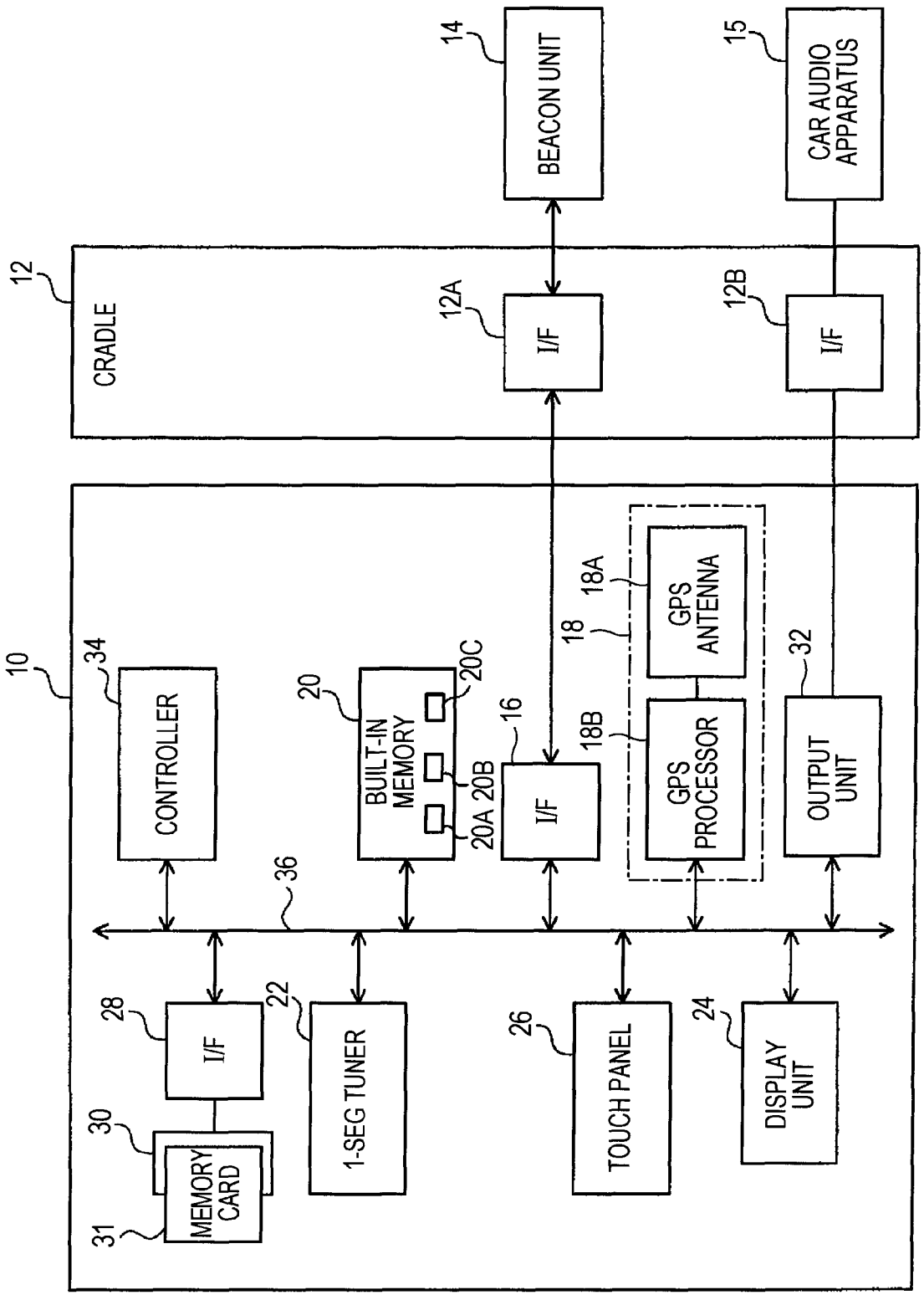
FIG. 2 is a block diagram illustrating a configuration of the navigation apparatus according to the embodiment.

As shown in FIG. 2, the in-car cradle 12 includes a beacon interface 12A and an audio interface 12B.

The beacon interface 12A is connected to a beacon unit 14 mounted on the car interior 2.

The beacon unit 14 receives traffic information from a vehicle information and communication system (VICS).

The cradle side interface 12A supplies to the navigation apparatus 10 the traffic information supplied from the beacon unit 14.

The audio interface 12B is connected to a car audio apparatus 15 mounted on the car interior 2.

The audio interface 12B supplies to the car audio apparatus 15 an audio signal supplied from an output unit 32 described later.

The navigation apparatus 10 includes a navigation apparatus side interface 16, a GPS unit 18, a built-in memory 20, a 1-SEG tuner 22, a display unit 24, and a touch panel 26.

In addition, the navigation apparatus 10 further includes a memory card interface 28, a memory card slot 30, an output unit 32, a controller 34, and the like.

These components 16, 18, 20, 22, 24, 26, 28, 30, 32, and 34 are connected to each other via a bus 36.

The navigation apparatus side interface 16 is connected to the cradle side interface 12A in the state where the navigation apparatus 10 is mounted on the in-car cradle 12.

In this state, the navigation apparatus side interface 16 receives the traffic information supplied from the beacon unit 14 through the cradle side interface 12A and supplies the traffic information to the controller 34.

The GPS unit 18 includes a GPS antenna 18A and a GPS processor 18B.

The GPS processor 18B receives a positioning electric wave transmitted from a GPS satellite through the GPS antenna 18A.

The GPS processor 18B detects a position of the navigation apparatus 10 based on the received positioning electric wave to generate position data representing the position.

The built-in memory 20 includes a flash ROM 20A, a RAM 20B, and a ROM 20C.

The flash ROM 20A stores a control program or the like that is executed by a CPU of the controller 34 described later.

The RAM 20B stores data that are used for processes of the CPU.

The ROM 20C stores various data that are to be displayed on the display unit 24.

The data that are to be displayed on the display unit 24 include map data for navigation, text data constituting a menu screen or the like, and image data. In other words, by displaying the data on the display unit 24, a first screen D1, a second screen D2, a third screen D3, and a pop-up menu 60 (refer to FIGS. 3 to 8) described later are configured.

In addition, instead of the ROM 20C, a hard disk device or a recording medium such as a CD-ROM and a DVD-ROM may be arbitrarily used.

The 1-SEG tuner 22 receives broadcast electric waves from a terrestrial digital broadcast and reproduces the video signal and the audio signal of a television broadcast.

The display unit 24 includes a display screen 24A (refer to FIG. 3) to perform screen displaying based on the display data supplied from the controller 34.

In the embodiment, although the display unit 24 is constructed with a liquid crystal display, various display apparatuses such as an organic EL display that are in the related art may be used as the display unit 24.

The touch panel 26 is configured to cover the display screen 24A of the display unit 24 so as to receive user's manipulation input in response to the manipulation of contacting the touch panel 26.

The touch panel 26 may employ various structures, for example, a structure of a so-called film-film type touch panel that is configured to have two transparent PET films and a transparent electrode film interposed between the two films.

The touch panel 26 has a size of covering the entire area of the display screen 24A.

The touch panel 26 is overlapped on the display screen 24A and adhered with an adhesive, so that the touch panel 26 is integrally provided to the display unit 24.

In addition, a portion of the display screen 24A may be covered with the touch panel 26, and thus, a remaining portion of the display screen 24A may be configured as a non-sensitive area which is not covered with the touch panel 26.

The memory card interface 28 performs recording data in the memory card 31 inserted into the memory card slot 30 and reading data from the memory card 31.

The memory card 31 stores various data that are used for the navigation apparatus 10.

As an example of the data, there are contents data such as audio signal of music or a video signal of a still picture or a moving picture.

The output unit 32 is supplied with the audio signal that is read from the memory card 31 through the memory card interface 28 and supplies the audio signal to the audio interface 12B.

In addition, the output unit 32 supplies to the audio interface 12B the audio signal supplied from the 1-SEG tuner 22.

Accordingly, music of the car audio apparatus 15 or audio of a television broadcast is reproduced.

The controller 34 has a CPU, so that the CPU functions to execute a control program stored in the flash ROM 20A. In addition, the controller 34 is operated in response to the manipulation of contacting the touch panel 26.

The controller 34 includes a graphic controller, a video RAM, and the like.

Under the control of the CPU, the graphic controller performs a graphic process by using the map data, the text data, and the image data read from the ROM 20C to generate display data and supplies the display data to the display unit 24.

The video RAM temporarily stores the display data that are processed by the graphic controller.

The controller 34 allows the display unit 24 to display a map or a menu screen based on the position data supplied from the GPS processor 18B and the map data, the text data, and the image data supplied from the ROM 20C.

In other words, the controller 34 executes the control program, so that a current position indicating the position of the vehicle together with the map data is displayed on the display screen 24A of the display unit 24 and navigation to a destination is performed.

In addition, the controller 34 supplies to the output unit 32 the audio signal supplied from the memory card 31 or allows the display unit 24 to display a video based on the video signal supplied from the memory card 31.

In addition, the controller 34 allows the display unit 24 to display a received video based on the video signal supplied from the 1-SEG tuner 22.

In other words, the controller 34 executes the control program, so that the contents data supplied from the 1-SEG tuner 22 or the contents data supplied from the memory card 31 are provided to a user.

In addition, in the embodiment, the controller 34 corresponds to a display controller in the Claims.

Next, the screens displayed on the display screen 24A of the display unit 24 are described in detail.

In addition, for simplifying the description, it is assumed that one of three screens, that is, a first screen, a second screen, and a third screen is displayed on the display screen 24A of the display unit 24.

Figure 3:
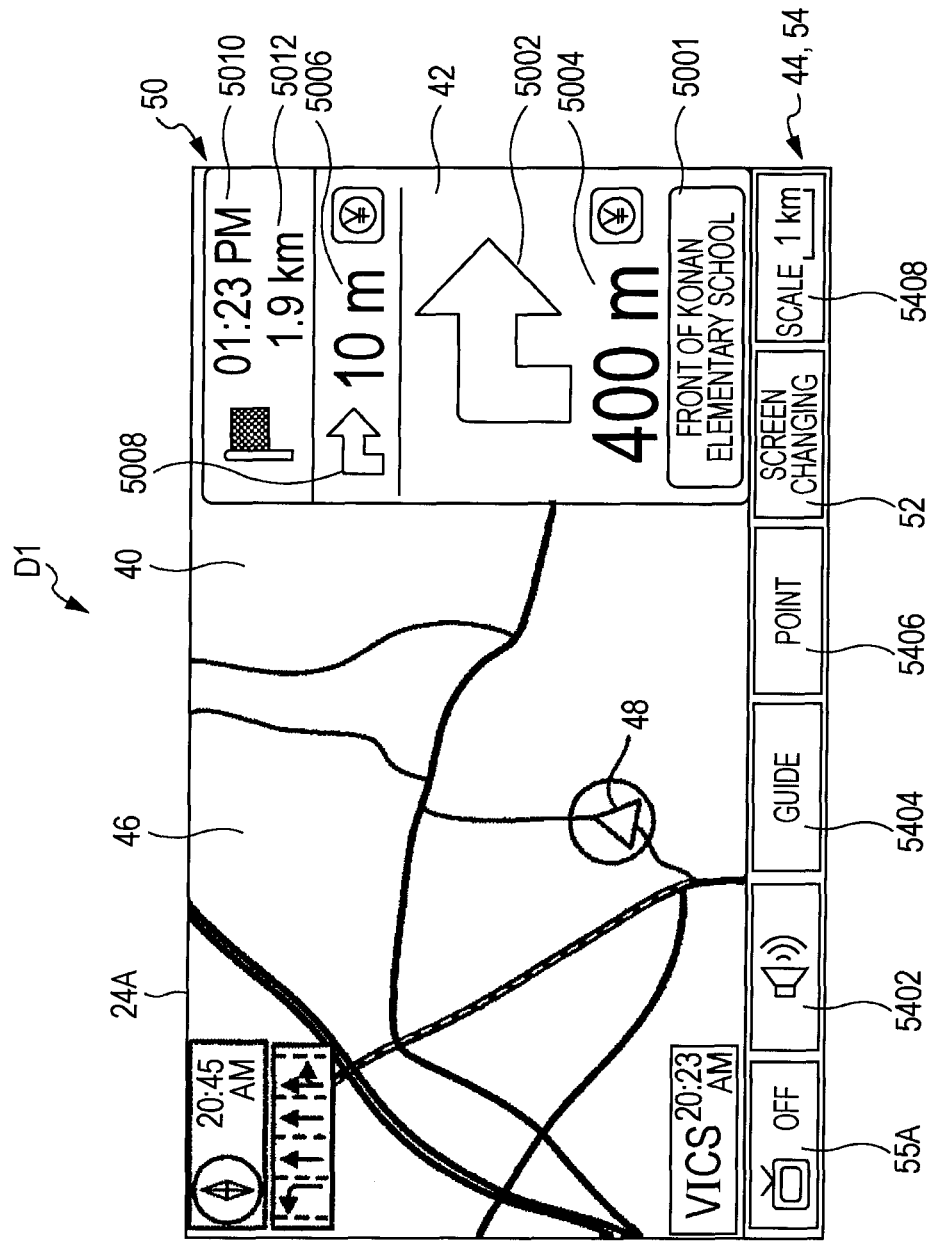
FIG. 3 is a diagram illustrating a first display screen.

As shown in FIG. 3, the first screen D1 includes a map display area 40, a guide display area 42, and a manipulation button display area 44.

The map display area 40 is a display area for displaying a map 46 including images (icons) representing roads or facilities and text representing place names or names of facilities.

In addition, an arrow mark 48 indicating the position and driving direction of the vehicle is displayed on the map 46 in the map display area 40.

In the embodiment, in the first screen D1, the map display area 40 is disposed in a rectangular shape in the left upper region of the first screen D1.

More specifically, the map display area 40 occupies about ⅔ of the display screen 24A in the width direction and about 9/10 of the display screen 24A in the height direction.

The guide display area 42 is a display area for displaying guide information for performing navigation, that is, guide information 50 for guiding the driving direction of the vehicle.

In the embodiment, the guide information 50 includes a name of crossroads 5001, an arrow 5002 indicating the driving direction at the crossroads, a distance 5004 from the crossroads, a distance 5006 between the current crossroads to the next crossroads, and an arrow 5008 indicating the driving direction at the next crossroads.

In addition, the guide information 50 also includes an expected arrival time 5010 from the current position to the destination and a distance 5012 from the current position to the destination.

In addition, in the embodiment, in the first screen D1, the guide display area 42 is disposed in a rectangular shape in the right upper region of the first screen D1.

More specifically, the guide display area 42 is disposed to the right of the map display area 40.

The guide display area 42 occupies about the remaining ⅓ of the display screen 24A in the width direction and about 9/10 of the display screen 24A in the height direction similarly to the map display area 40.

The manipulation button display area 44 is a display area for displaying a screen changing button 52.

In the embodiment, in the first screen D1, the manipulation button display area 44 displays one or more manipulation buttons 54 associated with the first screen D1 as well as the screen changing button 52.

In other words, the manipulation button display area 44 displays one or more manipulation buttons 54 for executing an operation associated with the screen displayed on the first screen D1 in response to the manipulation of contacting thereof.

The screen changing button 52 is used to allow the controller 34 to execute a first displaying operation of circulatingly changing the first screen D1, the second screen D2, and the third screen D3 in a predetermined order to be displayed at each time of the manipulation of contacting the screen changing button 52.

In the embodiment, the manipulation buttons 54 displayed on the first screen D1 include a sound volume button 5402, a guide button 5404, a point button 5406, and a scaling button 5408.

The sound volume button 5402 is a button manipulated at the time of adjusting a sound volume for audio guidance.

The guide button 5404 is a button manipulated at the time of setting a guide method during the navigation.

The point button 5406 is a button manipulated at the time of setting a destination.

The scaling button 5408 is a button manipulated at the time of setting a scale of the map 46.

In addition, in the first screen D1, reference numeral 55A denotes an icon indicating that the video of the television broadcast received from the 1-SEG tuner 22 is in the non-displayed state, and the icon 55A is displayed in the manipulation button display area 44.

In the embodiment, the manipulation button display area 44 is disposed in a bar shape in the lowest region of the first screen D1.

More specifically, the manipulation button display area 44 is disposed to extend over the entire width-directional length of the display screen 24A with a uniform height.

The manipulation button display area 44 occupies about the remaining 1/10 of the display screen 24A in the height direction.

In the manipulation button display area 44, the icon 55, the sound volume button 5402, the guide button 5404, the point button 5406, the screen changing button 52, and the scaling button 5408 are aligned in the order from the left to the right.

Figure 4:
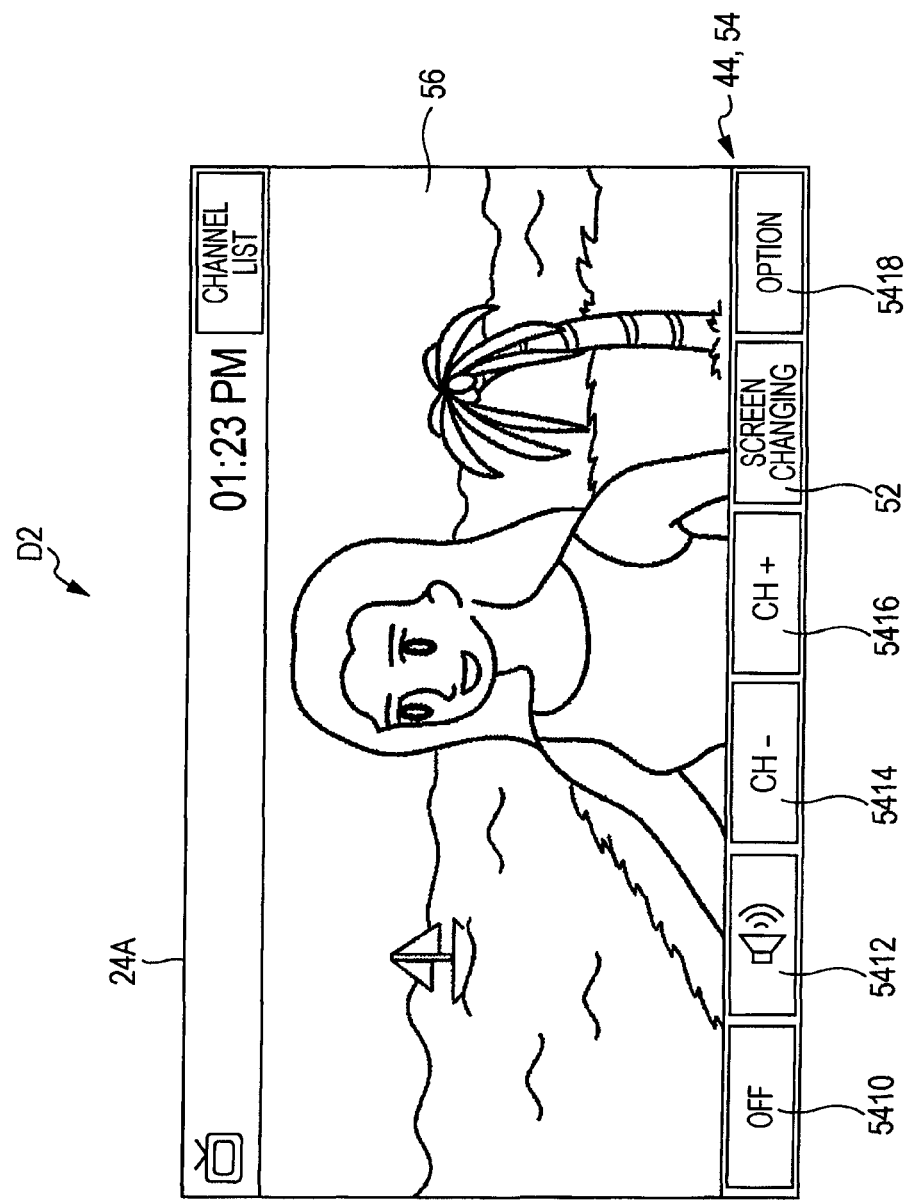
FIG. 4 is a diagram illustrating a second display screen.

As shown in FIG. 4, the second screen D2 includes a television broadcast display area 56, and the manipulation button display area 44.

The television broadcast display area 56 displays a received video of the television broadcast.

In the embodiment, in the second screen D2, the television broadcast display area 56 is disposed in a rectangular shape to extend over the entire width-directional length of the second screen D2.

The television broadcast display area 56 occupies about 9/10 of the display screen 24A in the height direction.

The manipulation button display area 44 is a display area for displaying the screen changing button 52 similarly to the first screen D1.

In the embodiment, in the second screen D2, the manipulation button display area 44 displays one or more manipulation buttons 54 associated with the second screen D2 as well as the screen changing button 52.

In other words, the manipulation button display area 44 includes one or more manipulation buttons 54 for executing an operation associated with the screen displayed on the second screen D2 in response to the manipulation of contacting thereof.

In the embodiment, the manipulation buttons 54 displayed on the second screen D2 include a power button 5410, a sound volume button 5412, a channel down button 5414, a channel up button 5416, and an option button 5418.

The power button 5410 is a button manipulated at the time of powering off the navigation apparatus 10.

The sound volume button 5412 is a button manipulated at the time of adjusting a sound volume of the received audio of the television broadcast.

The channel down button 5414 is a button manipulated at the time of changing the channel receiving the television broadcast into a lower numbered channel.

The channel up button 5416 is a button manipulated at the time of changing the channel receiving the television broadcast into a higher numbered channel.

The option button 5418 is a button manipulated at the time of changing settings associated with the viewing of the television broadcast.

The manipulation button display area 44 is disposed on the display screen 24A with the same size and position as those of the first screen D1.

In the manipulation button display area 44, the power button 5410, the sound volume button 5412, the channel down button 5414, the channel up button 5416, and the option button 5418 are aligned in the order from the left to the right.

Figure 5:
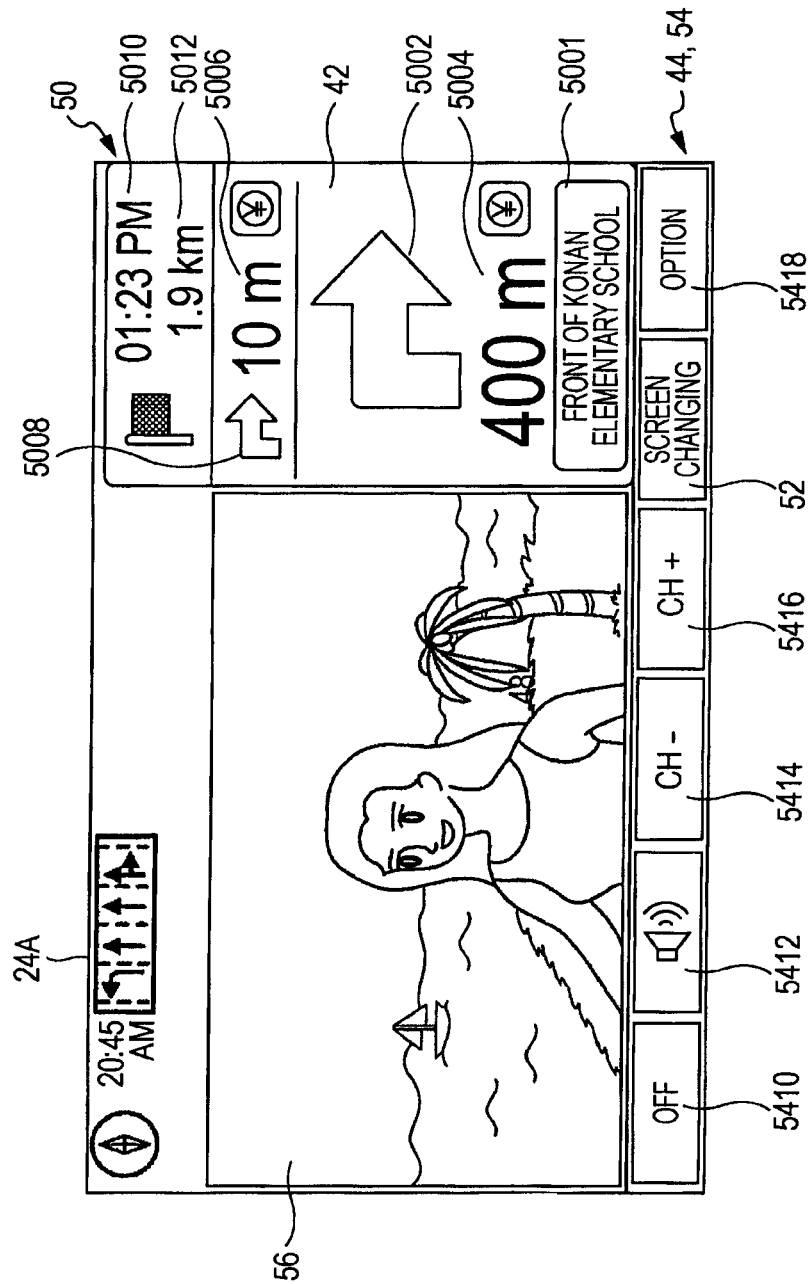
FIG. 5 is a diagram illustrating a third display screen.

As shown in FIG. 5, the third screen D3 includes the television broadcast display area 56, the guide display area 42, and the manipulation button display area 44.

In the embodiment, in the third screen D3, the television broadcast display area 56 is disposed in a rectangular shape in the left upper region of the third screen D3.

More specifically, the television broadcast display area 56 occupies about ⅔ of the display screen 24A in the width direction and about 9/10 of the display screen 24A in the height direction.

In the embodiment, in the third screen D3, the guide display area 42 is disposed in a rectangular shape in the right upper region of the third screen D3.

More specifically, the guide display area 42 is disposed to the right of the television broadcast display area 56.

The guide display area 42 occupies about the remaining ⅓ of the display screen 24A in the width direction and about 9/10 of the display screen 24A in the height direction similarly to the television broadcast display area 56.

The manipulation button display area 44 is a display area for displaying the screen changing button 52 similarly to the first screen D1 and the second screen D2.

In the embodiment, in the third screen D3, the manipulation button display area 44 displays one or more manipulation buttons 54 associated with the third screen D3 as well as the screen changing button 52.

In other words, the manipulation button display area 44 displays one or more manipulation buttons 54 for executing an operation associated with the screen displayed on the third screen D3 in response to the manipulation of contacting thereof.

In the embodiment, similarly to that of the second screen D2 shown in FIG. 4, the manipulation buttons 54 displayed on the third screen D3 include the power button 5410, the sound volume button 5412, the channel down button 5414, the channel up button 5416, and the option button 5418.

The manipulation button display area 44 is disposed on the display screen 24A with the same size and position as those of the first screen D1.

Similarly to the second screen D2, in the manipulation button display area 44, the power button 5410, the sound volume button 5412, the channel down button 5414, the channel up button 5416, and the option button 5418 are aligned in the order from the left to the right.

As shown in FIGS. 3, 4, and 5, the manipulation button display area 44 is displayed at the same position on the display screen 24A in any one of the first screen D1, the second screen D2, and the third screen D3.

In addition, the screen changing button 52 is displayed at the same position on the display screen 24A in the manipulation button display area 44 in any one of the first screen D1, the second screen D2, and the third screen D3.

Next, the pop-up menu 60 is described with reference to FIGS. 6, 7, and 8.

The pop-up menu 60 is displayed on each of the first screen D1, the second screen D2, and the third screen D3 in response to the manipulation of contacting the screen changing button 52 described later.

In the embodiment, the pop-up menu 60 occupies substantially the entire width-directional length of the display screen 24A and about ½ of the display screen 24A in the height direction.

More specifically, as shown in FIG. 6, the pop-up menu 60 is displayed on the display screen 24A so as to cover almost the map display area 40 and the guide display area 42.

In addition, as shown in FIG. 7, the pop-up menu 60 is displayed on the display screen 24A so as to cover almost the television broadcast display area 56.

In addition, as shown in FIG. 8, the pop-up menu 60 is displayed on the display screen 24A so as to cover almost the television broadcast display area 56 and the guide display area 42.

In other words, the pop-up menu 60 is displayed at the position in the display screen 24A outside the manipulation button display area 44.

The pop-up menu 60 includes a first screen selecting button 62, a second screen selecting button 64, and a third screen selecting button 66.

The first screen selecting button 62 is used to display the first screen D1 on the display screen 24A in response to the manipulation of contacting the first screen selecting button 62.

As shown in FIG. 6, the first screen selecting button 62 includes an icon 62A and text 62B associated with the first screen D1.

More specifically, the icon 62A of the first screen selecting button 62 represents the arrow mark 48 (refer to FIG. 3) indicating the position of the vehicle on the map 46, and the text 62B of the first screen selecting button 62 expresses "MAP".

The second screen selecting button 64 is used to display the second screen D2 on the display screen 24A in response to the manipulation of contacting the second screen selecting button 64.

As shown in FIG. 7, the second screen selecting button 64 includes an icon 64A and text 64B associated with the second screen D2.

The icon 64A of the second screen selecting button 64 represents the television apparatus, and the text 64B of the second screen selecting button 64 expresses "1-SEG".

The third screen selecting button 66 is used to display the third screen D3 on the display screen 24A in response to the manipulation of contacting the third screen selecting button 66.

As shown in FIG. 8, the third screen selecting button 66 includes an icon 66A and text 66B associated with the third screen D3.

The icon 66A of the third screen selecting button 66 represents the television apparatus and the arrow indicating the driving direction of the vehicle, and the text 66B of the third screen selecting button 66 expresses "1-SEG and GUIDE".

In addition, in the embodiment, the pop-up menu 60 further includes a music selecting button 68.

The music selecting button 68 is used to reproduce music in response to the manipulation of contacting the music selecting button 68. The operations after the manipulation of contacting the music selecting button 68 do not relate to the invention, and thus, the description thereof is omitted.

Next, the operations of the navigation apparatus 10 are described with reference to FIG. 9.

The navigation apparatus 10 is powered on, and one of the first screen D1, the second screen D2, and the third screen D3 is displayed on the display screen 24A of the display unit 24 (Step S10).

For example, in FIG. 3, the first screen D1 is displayed.

At the time, if the manipulation of contacting one of the manipulation buttons 54 is performed, the controller 34 executes an operation corresponding to the contacted manipulation button 54.

In addition, the controller 34 checks whether or not the manipulation of contacting the screen changing button 52 is performed (Step S12).

If the manipulation of contacting the screen changing button 52 is determined to be performed, the controller 34 changes the screens in a predetermined order to be displayed (Step S14).

In other words, the controller 34 executes the first displaying operation of circulatingly changing the first screen D1, the second screen D2, and the third screen D3 in this order to be displayed at each time of the manipulation of contacting the screen changing button 52.

In other words, in the state where the first screen D1 is displayed, if the manipulation of contacting the screen changing button 52 is performed, the controller 34 changes the screen into the second screen D2 to be displayed. In addition, in the state where the second screen D2 is displayed, if the manipulation of contacting the screen changing button 52 is performed, the controller 34 changes the screen into the third screen D3 to be displayed. In addition, in the state where the third screen D3 is displayed, if the manipulation of contacting the screen changing button 52 is performed, the controller 34 changes the screen into the first screen D1 to be displayed.

Next, at the same time of changing the screen in Step S14, the controller 34 displays the pop-up menu 60 on the display screen 24A as shown in FIGS. 5, 6, and 7 (Step S16).

In other words, the controller 34 executes the second displaying operation at the same time of the first displaying operation.

The second displaying operation is an operation of displaying on the display screen 24A the pop-up menu 60 including the first screen selecting button 62, the second screen selecting button 64, and the third screen selecting button 66 for directly selecting the first screen D1, the second screen D2, and the third screen D3.

Next, at the time of displaying the pop-up menu 60, the controller 34 distinctly displays the screen selecting button corresponding to the screen, which is changed to be displayed by the first displaying operation, among the screen selecting buttons 62, 64, and 66. In other words, the screen selecting button corresponding to the screen, which is changed to be displayed by the first displaying operation is focused and displayed on the display screen 24A.

At this time, each of the first screen selecting button 62, the second screen selecting button 64, and the third screen selecting button 66 includes the icon and text associated with each of the first screen D1, the second screen D2, and the third screen D3.

Therefore, even in the case where the display screen 24A is almost covered with the pop-up menu 60, a capability of manipulation is improved so as to easily determine which screen is displayed behind the pop-up menu 60.

In addition, by seeing the first screen selecting button 62, the second screen selecting button 64, and the third screen selecting button 66, all the selectable screens can be immediately checked, so that the capability of manipulation may be improved.

In addition, as an example of a method of focusing and displaying the screen selecting button, there may be the following method.

As shown in FIG. 6, in the case where the pop-up menu 60 is displayed on the first screen D1, as shown by hatching, the background color of the first screen selecting button 62 corresponding to the first screen D1 is changed into the color different from the background colors of the other selecting buttons 64, 66, and 68.

In addition, as shown in FIG. 7, in the case where the pop-up menu 60 is displayed on the second screen D2, as shown by hatching, the background color of the second screen selecting button 64 corresponding to the second screen D2 is changed into the color different from the background colors of the other selecting buttons 62, 66, and 68.

In addition, as shown in FIG. 8, in the case where the pop-up menu 60 is displayed on the third screen D3, as shown by hatching, the background color of the third screen selecting button 66 corresponding to the third screen D3 is changed into the color different from the background colors of the other selecting buttons 62, 64, and 68.

In addition, the method of focusing and displaying the screen selecting button is not limited to the aforementioned method, but a method of blinking the screen selecting button, a method of displaying a frame-shaped cursor surrounding the screen selecting button, or other various methods of focusing and displaying may be employed.

Next, the controller 34 checks whether or not the manipulation of contacting the screen changing button 52 is performed (Step S18).

If the manipulation of contacting the screen changing button 52 is determined to be performed, the controller 34 proceeds to Step S14, in which the screens are circulatingly changed in a predetermined order to be displayed.

Therefore, if the user repetitively performs the manipulation of the screen changing button 52 in Step S18, the first screen D1, the second screen D2, and the third screen D3 are circulatingly displayed in this order.

If the manipulation of contacting the screen changing button 52 is determined not to be performed in Step S18, the controller 34 proceeds to Step S20. More specifically, if the manipulation of contacting screen changing button 52 is not performed for a predetermined time, the manipulation of contacting the screen changing button 52 is determined not to be performed.

If the controller 34 proceeds to Step S20, the controller 34 checks whether or not one of the first screen selecting button 62, the second screen selecting button 64, and the third screen selecting button 66 is performed.

Next, if the manipulation of contacting the screen selecting buttons 62, 64, and 66 is not performed, the controller 34 does not display the pop-up menu 60 (Step S24), and the controller 34 returns to Step S10. More specifically, if the manipulation of contacting the screen selecting buttons 62, 64, and 66 is not performed for a predetermined time, the manipulation of contacting the screen selecting buttons 62, 64, and 66 is determined not to be performed.

In addition, if the manipulation of contacting one of the first screen selecting button 62, the second screen selecting button 64, and the third screen selecting button 66 is determined to be performed in Step S20, the controller 34 immediately displays the screen corresponding to the contacted screen selecting button (Step S22), and the controller 34 returns to Step S10.

In other words, the controller 34 executes the third displaying operation of displaying on the display screen 24A one screen selected among the first screen D1, the second screen D2, and the third screen D3 in response to the manipulation of contacting each of the screen selecting buttons 62, 64, and 66 displayed on the display screen 24A by the second displaying operation.

Therefore, as shown in FIG. 6, in the state where the pop-up menu 60 together with the first screen D1 is displayed, if the manipulation of contacting the second screen selecting button 64 is performed, the second screen D2 shown in FIG. 4 is displayed. In addition, if the manipulation of contacting the third screen selecting button 66 is performed, the third screen D3 shown in FIG. 5 is displayed. In addition, in the case where the manipulation of contacting the first screen selecting button 62 is performed, the manipulation is treated as invalid, so that the pop-up menu 60 is not displayed.

In addition, as shown in FIG. 7, in the state where the pop-up menu 60 together with the second screen D2 is displayed, if the manipulation of contacting the first screen selecting button 62 is performed, the first screen D1 shown in FIG. 3 is displayed. In addition, if the manipulation of contacting the third screen selecting button 66 is performed, the third screen D3 shown in FIG. 5 is displayed. In addition, in the case where the manipulation of contacting the second screen selecting button 64 is performed, the manipulation is treated as invalid, so that the pop-up menu 60 is not displayed.

In addition, as shown in FIG. 8, in the state where the pop-up menu 60 together with the third screen D3 is displayed, if the manipulation of contacting the first screen selecting button 62 is performed, the first screen D1 shown in FIG. 3 is displayed. In addition, if the manipulation of contacting the second screen selecting button 64 is performed, the second screen D2 shown in FIG. 4 is displayed. In addition, in the case where the manipulation of contacting the third screen selecting button 66 is performed, the manipulation is treated as invalid, so that the pop-up menu 60 is not displayed. Therefore, as shown in FIGS. 6, 7, and 8, in the case where the pop-up menu 60 is displayed on the display screen 24A, by performing the manipulation of contacting one of the screen selecting buttons 62, 64, and 66, a desired screen may be directly selected to be displayed.

According to the embodiment, by performing the manipulation of contacting the screen changing button 52, the pop-up menu 60 including the first screen selecting button 62, the second screen selecting button 64, and the third screen selecting button 66 is displayed.

Therefore, by selecting one screen selecting button from the screen selecting buttons and performing the manipulation of contacting the screen selecting button, a desired screen may be immediately displayed. Accordingly, in comparison with the case where the screens are circulatingly changed in a predetermined order to be displayed by repetitively performing the manipulation of contacting screen changing button 52, a capability of manipulation may be advantageously improved.

In addition, by performing the manipulation of contacting the screen changing button 52, at the same time of circulatingly changing the screens in a predetermined order to be displayed, the pop-up menu 60 is displayed. Therefore, a specific manipulation button for displaying the pop-up menu 60 is not separately provided, so that an effort of manipulating the specific manipulation button is not necessary. Accordingly, a capability of manipulation may be advantageously improved.

In addition, the user may select a desired method between the method of sequentially changing the screens by repetitively performing the manipulation of contacting the screen changing button 52 and the method of selecting a screen by using the pop-up menu 60, so that a degree of freedom in the capability of manipulation may be advantageously obtained.

In addition, in the embodiment, the position of the screen selecting button 52 on the display screen 24A is fixed in any one of the first screen D1, the second screen D2, and the third screen D3. Therefore, at the time of repetitively performing the manipulation of contacting the screen changing button 52, too much attention is not necessarily paid to the display screen 24A, so that the capability of manipulation may be advantageously improved.

In addition, in the embodiment, the case where three screens, that is, the first screen D1, the second screen D2, and the third screen D3 are changed to be displayed on the display screen 24A is described. However, the invention may be adapted to the case where four or more screens are changed to be displayed on the display screen 24A.

The present application contains subject matter related to that disclosed in Japanese Priority Patent Application JP 2009-015735 filed in the Japan Patent Office on Jan. 27, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A navigation apparatus comprising:
   a display unit having a display screen, the display screen having a screen horizontal width;
   a touch panel provided to the display screen; and
   a display controller that selectively changes a first screen, a second screen, and a third screen to be displayed on the display screen, in response to manipulation of contacting a screen changing button on the touch panel,
   wherein the first screen has a map display area displaying a map and a guide display area for displaying guide information for guiding a driving direction of a vehicle,
   wherein the second screen has a television broadcast display area which occupies the horizontal width of the screen for displaying a received video of television broadcast,
   wherein the third screen has the television broadcast display area which occupies a portion of the horizontal width of the screen and the guide display area which occupies a remaining horizontal width portion of the screen,
   wherein each of the first screen, the second screen, and the third screen has a manipulation button display area for displaying the screen changing button and one or more manipulation buttons that correspond to content displayed on the display screen, and
   wherein, at each time of manipulation of contacting the screen changing button of the manipulation button display area, the display controller:
      performs a first displaying operation of circulatingly changing the first screen, the second screen, and the third screen to be displayed in a predetermined order,
      performs, simultaneously with the performing of the first displaying operation, a second displaying operation of initiating displaying on the display screen a pop-up menu including a first screen selecting button, a second screen selecting button, and a third screen selecting button for directly selecting the first screen, the second screen, and the third screen respectively in response to further respective manipulation of contacting the first screen selecting button, the second screen selecting button, and the third screen selecting button, at the same time of the first displaying operation,
      performs a third displaying operation of displaying on the display screen one screen selected from among the first screen, the second screen, and the third screen in response to further manipulation of contacting a corresponding one of the first screen selecting button, the second screen selecting button, and the third screen selecting button displayed on the display screen by the second displaying operation, and
      changes operations of the one or more manipulation buttons in the manipulation button area, in response to selection of the first screen, the second screen, and the third screen.

2. The navigation apparatus according to claim 1, wherein the pop-up menu is displayed at a position of the display screen outside the manipulation button display area.

3. The navigation apparatus according to claim 1,
   wherein the manipulation button display area in any one of the first screen, the second screen, and the third screen is displayed at the same position on the display screen, and
   wherein the screen changing button in the manipulation button display area of any one of the first screen, the second screen, and the third screen is displayed at the same position on the display screen.

4. The navigation apparatus according to claim 3, wherein the one or more manipulation buttons change appearance and operation depending on the screen being displayed.

5. The navigation apparatus according to claim 1, wherein, at the time of displaying the pop-up menu by the second displaying operation, the controller focuses and displays on the display screen the screen selecting button corresponding to the screen changed to be displayed by the first displaying operation among the first screen selecting button, the second screen selecting button, and the third screen selecting button.

6. The navigation apparatus according to claim 1, wherein the first screen selecting button, the second screen selecting button, and the third screen selecting button include at least one of icons and text corresponding to the first screen, the second screen, and the third screen.

7. The navigation apparatus according to claim 1, wherein the guide display area comprises guide information for guiding the vehicle, the guide information comprising at least one of a name of crossroads, an arrow indicating the driving direction at the crossroads, a distance from the crossroads, and a distance between the current crossroads to the next crossroads.

8. The navigation apparatus according to claim 1,
wherein the first screen comprises the map display area that occupies a portion of the screen horizontal width, and the guide display area occupies a remaining portion of the screen horizontal width, and the two portions add up to the screen horizontal width.

9. The navigation apparatus according to claim 1,
wherein the third screen comprises the television broadcast display area that occupies a portion of the screen horizontal width, and the guide display area occupies a remaining portion of the screen horizontal width, and the two portions add up to the screen horizontal width.

10. A navigation apparatus comprising:
a display unit having a display screen;
a touch panel provided to the display screen; and
a display controller that selectively changes a first screen, a second screen, and a third screen to be displayed on the display screen, in response to manipulation of contacting a screen changing button on the touch panel,
wherein each of the first screen, the second screen, and the third screen has a manipulation button display area for displaying the screen changing button,
wherein, the display controller performs, at each time of manipulation of contacting the manipulation button display area,
a first displaying operation of circulatingly changing the first screen, the second screen, and the third screen to be displayed in a predetermined order,
a second displaying operation, performed simultaneously with the performing of the first displaying operation, of initiating displaying on the display screen a pop-up menu including a first screen selecting button, a second screen selecting button, and a third screen selecting button for directly selecting the first screen, the second screen, and the third screen respectively in response to further respective manipulation of contacting the first screen selecting button, the second screen selecting button, and the third screen selecting button, at the same time of the first displaying operation, and
a third displaying operation of displaying on the display screen one screen selected from among the first screen, the second screen, and the third screen in response to further manipulation of contacting a corresponding one of the first screen selecting button, the second screen selecting button, and the third screen selecting button displayed on the display screen by the second displaying operation, and
wherein, at each time of manipulation of contacting the manipulation button display area, the display controller performs the second displaying operation simultaneously with the performing of the first displaying operation.

* * * * *